Figure 1A:
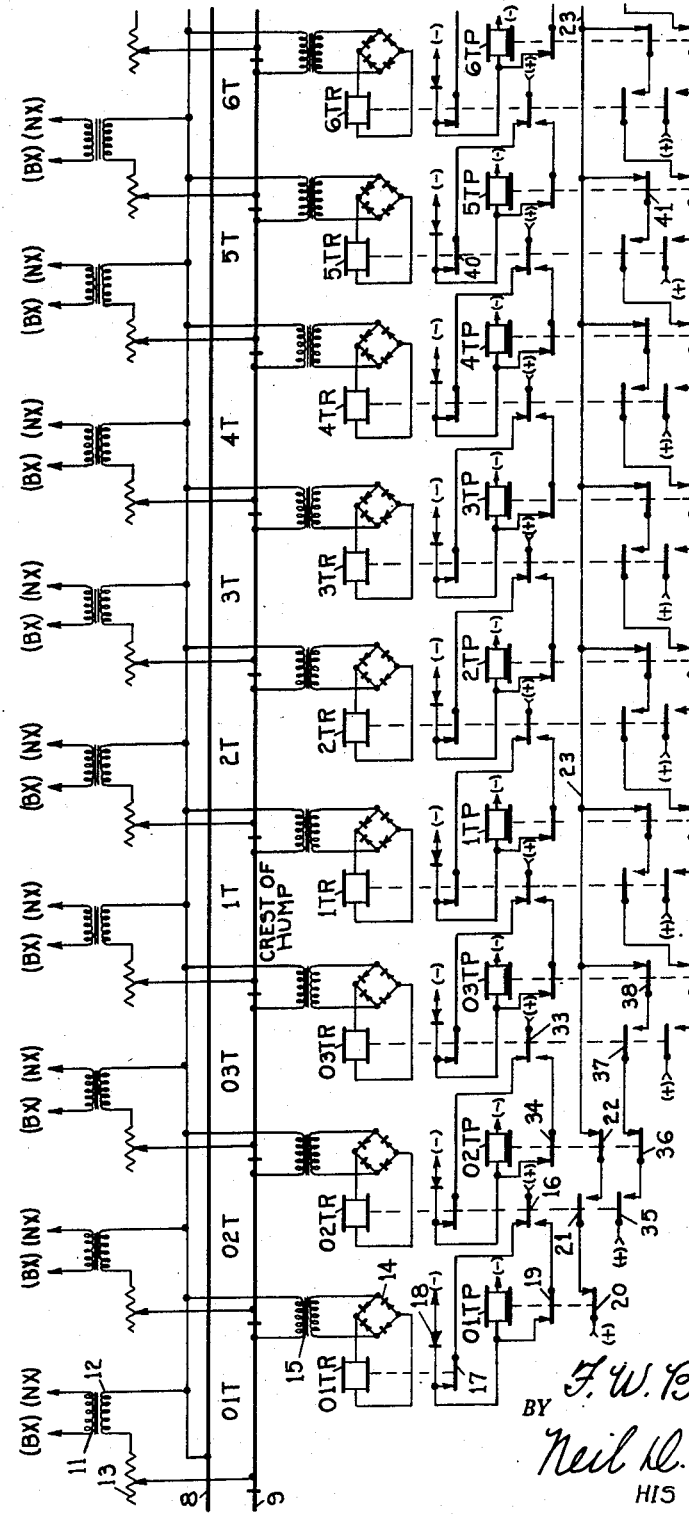

Sept. 28, 1954   F. W. BRIXNER   2,690,238
CAR RETARDER CONTROL SYSTEM
Filed Feb. 27, 1951   3 Sheets-Sheet 1

INVENTOR.
F. W. Brixner,
BY
Neil D. Preston,
HIS ATTORNEY.

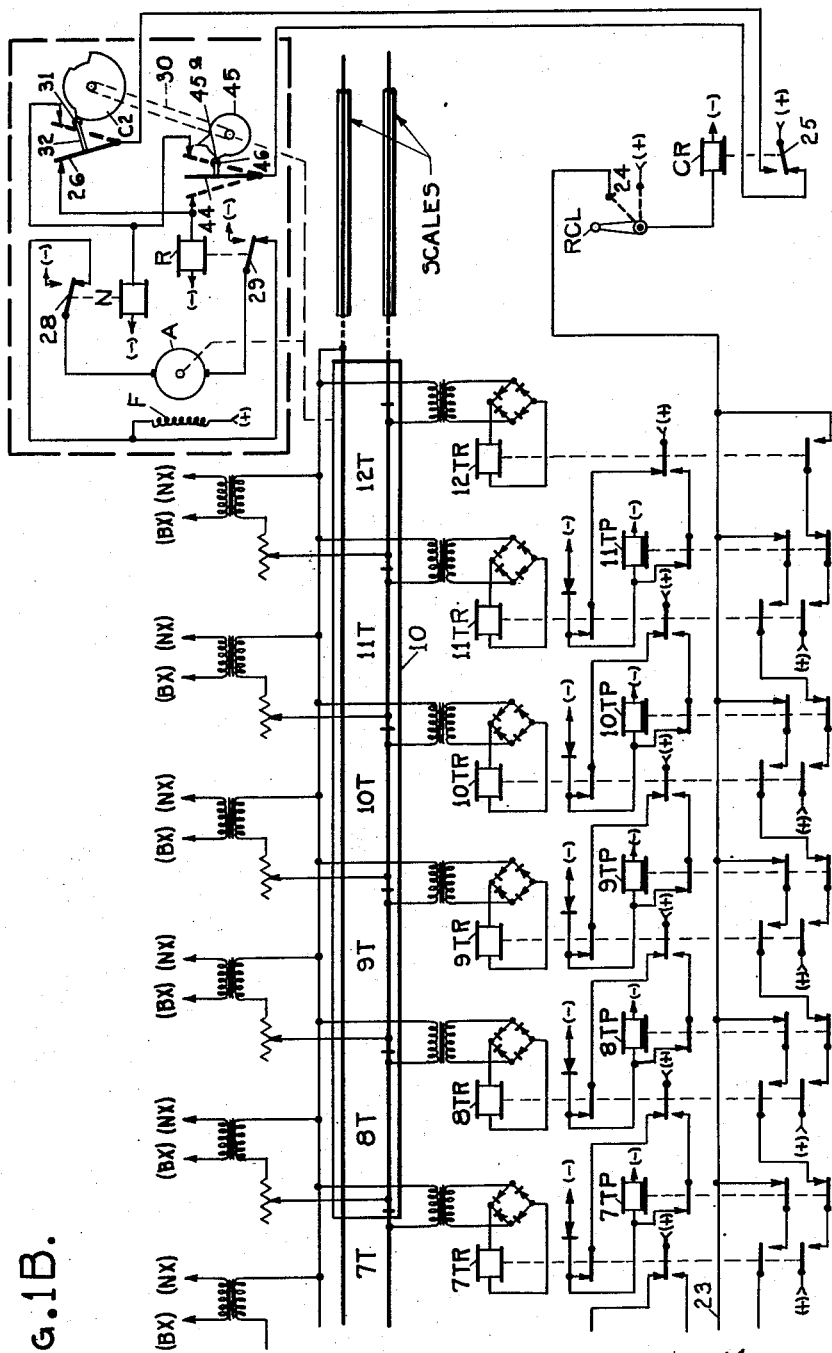

Sept. 28, 1954     F. W. BRIXNER     2,690,238
CAR RETARDER CONTROL SYSTEM
Filed Feb. 27, 1951     3 Sheets-Sheet 3
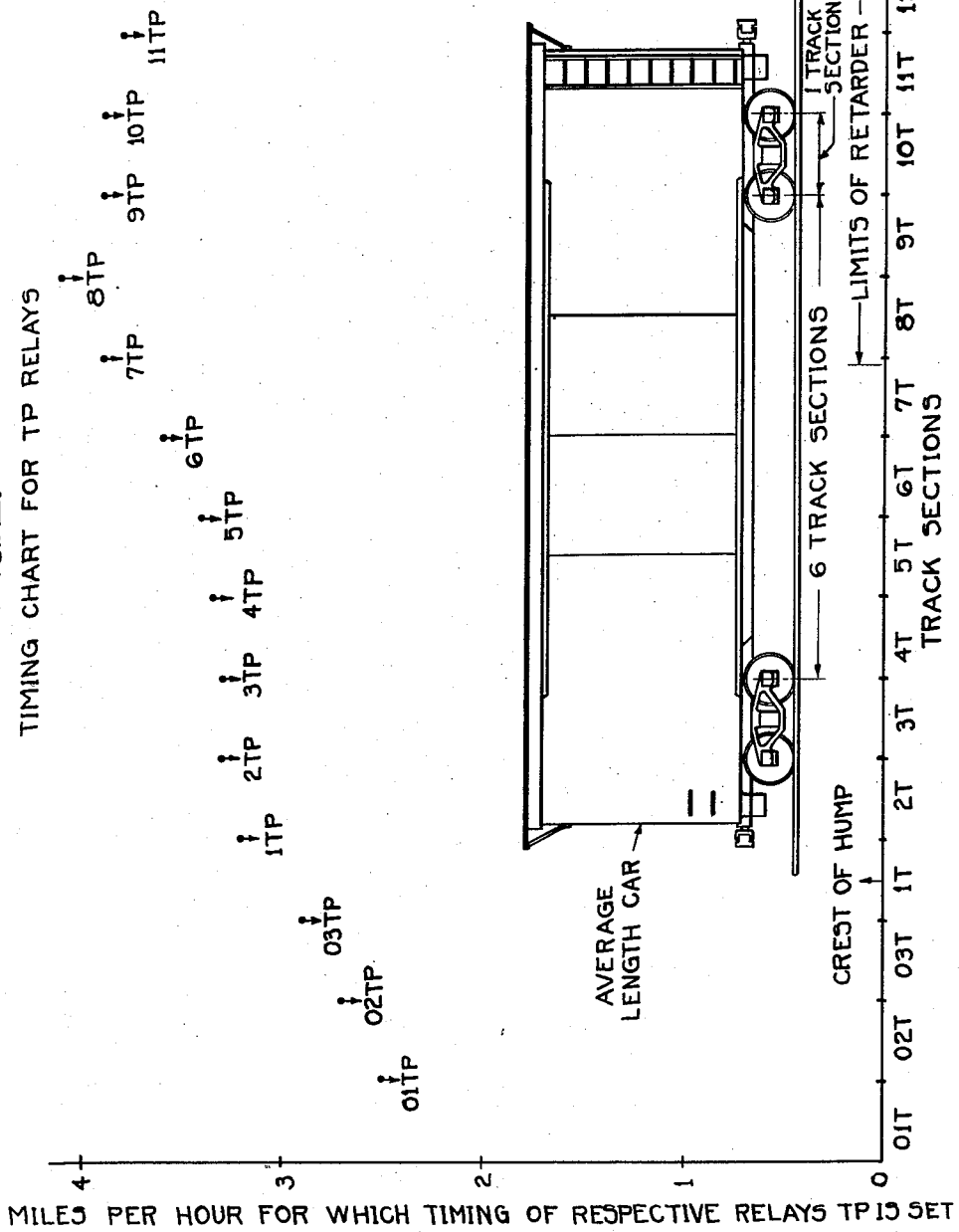
INVENTOR.
F. W. Brixner,
BY Neil W. Preston,
HIS ATTORNEY.

Patented Sept. 28, 1954

2,690,238

UNITED STATES PATENT OFFICE 2,690,238

CAR RETARDER CONTROL SYSTEM

Frederick W. Brixner, Rochester, N. Y., assignor to General Railway Signal Company, Rochester, N. Y.

Application February 27, 1951, Serial No. 212,903

5 Claims. (Cl. 188—62)

1

This invention relates to the control of railway car retarders of the type that are located along the trackway of a classification yard for selectively applying brake pressure to the wheels of cars passing through the retarder, and it more particularly relates to the automatic control of a retarder in accordance with the speed of an approaching car.

One condition under which such an approach control system has utility is in the control of the retarder in approach to a weighing scale in a hump classification yard. In order to record the weight of a rolling car, the car must be on the weighing rails of the scale for a predetermined length of time, and thus, if the car is moving too rapidly, there is not time for the weight to be recorded. It is therefore desirable that the speed of each car to be weighed be reduced to a predetermined maximum speed in approaching the scale which will permit weighing.

Generally speaking, and without attempting to define the scope of the present invention, the system according to the present invention includes a number of short track circuits in approach to and extending part way through a car retarder, the length of the track sections being such that the trucks of the cars passing through the track sections will substantially always have their respective axles in two adjoining track sections. Thus the length of the track sections is substantially equal to the spacing of the axles of each of the trucks.

Each of the track sections has a normally energized track relay and a slow acting direct repeater relay. The drop away time of the track repeater relay for each of the track sections is such that if the track repeater relay has time to drop away while its associated track circuit is shunted, before the track relay is dropped away for the next track section in advance, it is an indication that the speed of the car is low enough so as not to need retardation. If, however, the track repeater relays do not have time to drop away while their associated track sections are shunted, the car retarder is actuated to a position to brake the car until speed is reduced to permit the dropping away of one of the track repeater relays. The car retarder stands normally open so that unretarded passage can be made through the retarder at low speed in either direction without requiring the manual actuation of a retarder control switch to open the retarder. In other words, the only time that the retarder is actuated to a retarding position is when it is actuated by the approach of a car above a predetermined speed limit.

2

An object of the present invention is to so govern the operation of a car retarder by a control relay that the retarder is normally in its open position in accordance with one position of the control relay, and is actuated to a retarding position by a control circuit selected by the control relay only for the time period during which neither of the track repeater relays has had time to be dropped away for either of two adjoining track sections that are shunted by the respective axles of one of the trucks of a car.

Other objects, purposes, and characteristic features of the present invention will be in part obvious from the accompanying drawings, and in part pointed out as the description of the invention progresses.

In describing the invention in detail, reference is made to the accompanying drawings in which certain similar parts are identified by corresponding letter reference characters, generally made distinctive by preceding numerals indicative of the particular track sections with which the respective devices are associated; and wherein:

Figs. 1A and 1B when placed end to end illustrate the general organization of one embodiment of the present invention as applied to a stretch of railway track having a car retarder in approach to a car weighing scale; and, Fig. 2 is a timing chart showing typical time settings for the respective track sections.

The general organization of the embodiment of the invention according to Figs. 1A and 1B comprises a stretch of track having track rails 8 and 9 passing over the hump of a classification yard, such stretch of track being divided into a series of track sections by suitable insulated joints, the length of the track sections being approximately 5 feet 6 inches, which is the usual spacing of the axles of the respective trucks of railway freight cars.

Associated with the stretch of track is a suitable car retarder represented by the rectangular block 10. This retarder can be of the general character shown, for example, in the prior patent to W. K. Howe, No. 1,852,572, dated April 5, 1932, or any other suitable retarder of this general character may be employed.

Inasmuch as the track circuits extend through the portion of the trackway within the retarder 10, it is preferable to use single rail track circuits so that only one rail needs to be insulated from the retarder. Thus the trackway is divided into 15 successive single rail track sections of substantially equal length, the track sections 01T, 02T, and 03T being to the left of the crest of the hump as shown in Fig. 1A, and the track sections 1T to 12T inclusive being to the right of the hump. Each of the track sections has a track circuit comparable to the track circuit for track section 01T which will be more specifically considered.

The track section 01T, for example, has a track feed transformer with a primary winding 11 connected to a suitable source of alternating current. One side of the secondary winding 12 of the track feed transformer for the track section 01T is connected to the common rail 9, and the other side of the secondary winding 12 is connected through a suitable adjustable track resistor 13 to the entering end of the track section 01T. The track relay 01TR is associated with the exit end of the track section 01T, and this relay is energized by the output of a full-wave rectifier 14, which in turn has its input coupled through the transformer 15 to the track rails of the track section 01T.

Having thus described specifically the first of several successive track circuits, it is to be understood that track relays 02TR, 03TR and 1TR to 12TR inclusive for track sections 02T to 12T inclusive are similarly normally energized by similar track circuits.

Each of the track relays TR has associated therewith a normally energized track repeater relay TP which has slow drop away characteristics adjusted to match the drop away time of that relay with the desired speed of a car passing through the associated track section in order to attain a predetermined desired speed for leaving the car retarder in direct approach of the weighing rails of the scale. It is to be understood that although the track repeater relays TP have respective half-wave rectifiers illustrated as being shunted across their windings for obtaining the desired slow release characteristics, that other means well known in the art may be employed as required in practice for adjusting the relays to the desired time of drop away.

Rather than the relays TP being direct repeaters of the associated track relays TR, each of the relays TP is energized through a front contact of the track relay TR for the next track section in advance for reasons to be more readily apparent as the description of the invention progresses. Thus the relay 01TP, for example, is normally maintained picked up by a circuit extending through front contact 16 of relay 02TR and through front contact 17 of relay 01TR. The other relays TP are normally maintained energized by similar circuits.

The car retarder operating mechanism comprises a motor armature A, a field winding F, respective contactor relays N and R for directly governing the direction of rotation of the car retarder motor to respectively open or close the retarder, and suitable circuit controller cams and associated mechanism actuated by the movement of the retarder.

The energization of the contactor relay N or R is selected by a suitable retarder control relay CR, which in turn is governed, when automatic control of the retarder is selected by a manual control lever RCL, in accordance with the speed control track circuit organization. The relay CR has slow drop away characteristics for purposes to be more readily apparent as the description of the invention progresses.

To consider the specific circuit organization and mode of operation of the system provided according to the present invention, it will be assumed that the apparatus is conditioned normally as illustrated in the drawings with no cars present in the respective track sections. To condition the system for automatic control of the retarder 10, the operator actuates his retarder control lever RCL to its first right-hand operating position and thus conditions the retarder control relay CR so that it can be energized by track relay control.

When a car enters the track section 01T, the shunting of the track rails of that track section causes the dropping away of the relay 01TR, and the dropping away of this relay opens the normally energized circuit for the repeater relay 01TP at front contact 17. The relay 01TP has the half-wave rectifier 18 shunted across its winding so that it is slow in dropping away, and therefore the timing of the relay 01TP is started as the car enters the track section 01T.

With reference to Fig. 2, the time settings for the track repeater relays in terms of the miles per hour for which the settings are made are plotted for a typical hump grade. It will be noted that the permitted speed in miles per hour through the respective track sections below which the relays TP will have time to be dropped away increases progressively from the first track section to the track section 8T, which is the first track section within the retarder. By this arrangement of timing, if cars are humped at the substantially conventional two miles per hour rate, the timing is such that the front trucks of the cars will not ordinarily exceed the speed for which the timing is set, but the rear trucks of the faster cars will exceed the speed settings for various ones of the respective track sections so as to cause the closing of the retarder. In other words, because of the timing being set for the various track sections for speeds as illustrated in Fig. 2, the control of the closing and opening of the retarder is by the rear trucks of the cars rather than by the forward trucks.

Because of the timing for the first track section 01T being set for 2.5 miles per hour, which is .5 mile per hour above the humping speed, the track repeater relay 01TP will be dropped away by occupancy of the track section 01T by the forward truck of each car being humped. After the car has its forward trucks over the crest of the hump and is uncoupled, it starts to accelerate above the two miles per hour speed, and in doing so, it may reach a speed above the 2.5 miles per hour setting of the relay 01TP for the first track section as timed by the rear trucks of the car. At this time the forward trucks may be passing through tracks section 3T or 4T, but the timing relays TP for these track sections are set for speeds above three miles per hour, so these relays TP will have time to be dropped away as the front trucks of the car pass through the respective track sections. Thus it will be seen that by reason of the time settings for the respective track sections being less (set for a higher speed) in the order in which they become occupied, the front trucks of the car do not close, or hold closed, the retarder, but the control of the retarder is wholly maintained by the rear trucks of the car for the track sections in approach to the retarder.

If a car is assumed to be travelling fast enough so as to enter the track section 2T with its rear trucks and cause the dropping away of the relay 02TR before the relay 01TP has had time to drop away, the shifting of contact 16 of relay 02TR establishes a stick circuit for the relay 01TP to prevent its dropping away. This stick circuit extends through back contact 16 of relay 02TR and front contact 19 of relay 01TP. It is thus provided that the timing of the relay 01TP is for the passage of the front axle wheels of the rear truck of the car through the track section 01T, and the presence of the second axle wheels of the rear truck in the track section 01T does not affect the timing operation because of the stick circuit established for the relay 01TP upon the dropping away of the track relay 02TR for the second track section.

Because of the relay 01TP not having had time to drop away during passage of the front axle of the rear truck through the track section 01T, a circuit is closed for the energization of the relay CR extending from (+), including front contact 20 of relay 01TP, back contact 21 of relay 02TR, front contact 22 of relay 02TP, wire 23, contact 24 of the retarder control lever RCL and winding of relay CR, to (—). Relay CR when picked up energizes the motor contactor R by a circuit extending from (+), including front contact 25 of relay CR, contact 26 of the circuit controller mechanism of the retarder in its left-hand position and winding of the contactor R, to (—).

Contactor R when picked up applies energy through the series field winding F of the retarder motor, back contact 28 of contactor N, armature A and front contact 29 of contactor R so as to operate the retarder control motor in a direction to actuate the retarder 10 to a car retarding position to provide a particular predetermined degree of retardation.

When the car retarder mechanism is being driven to a retarding position, the shaft 30 is rotated in a clockwise direction, and the circuit that has been described for the operation of the motor is maintained closed as long as the roller 31 of the pusher 32 rides on the high portion of the cam C2. When the cam C2 has rotated to a position so as to permit the roller 31 to drop into the lower portion of the cam C2, the contact 26 is shifted so as to open the circuit that has been described for the car retarder motor. The contact 26 assumes a center position at this time so as to prevent the energization of either of the contactors N or R through this contact. Thus the motor of the car retarder is stopped at a time when the retarder has been actuated to a predetermined desired braking position. The car retarder when actuated to this position is maintained in its retarding position as long as the retarder control relay CR is maintained picked up so as to maintain its back contact 25 open.

If the speed of the car continues to be above the timing rate of the track repeater relays TP for the respective track sections occupied by the rear truck of the car, the relay CR is maintained picked up, and thus the retarder is maintained in its operated position as has been described. Thus if the wheels of the front axle of the rear truck shunt the track section 03T and cause the dropping away of the track relay 03TR, before the track repeater relay 02TP has had time to be dropped away, a stick circuit is established through back contact 33 of relay 03TR and front contact 34 of relay 02TP so as to maintain relay 02TP picked up in a manner comparable to that which has been specifically considered with respect to the control of the relay 01TP as the car advances. With the track section 03T shunted by the front axle of the rear truck and the track section 02T shunted by the rear axle of the rear truck, energy is applied to the relay CP by a circuit extending from (+), including back contact 35 of relay 02TR, front contact 36 of relay 02TP, back contact 37 of relay 03TR, front contact 38 of relay 03TP, wire 23, contact 24 of lever RCL, and winding of relay CR, to (—).

If, because of the spacing of the respective axles of the rear truck of the car being substantially the length of the track sections, the relay 02TR should have a chance to be momentarily picked up prior to the track section 02T being shunted by the wheels associated with the rear axle of the rear truck, the circuit for the energization of relay CR may be momentarily interrupted, but this relay is maintained picked up by its slow acting characteristics for a period of time sufficient to bridge any momentary deenergization of this nature.

The detailed consideration that has been given to the progress of the car and the means for maintaining the retarder control relay CR energized can be considered typical of the means provided from track section to track section through the respective 15 track circuits as long as the speed of the car is in excess of the predetermined speed which has been set as ideal for the passage of the rear truck through each of the respective track sections.

Having thus considered the mode of operation for actuation of the retarder 10 to its retarding position in accordance with the approach of a car above a particular predetermined speed, it will be assumed that such car enters the retarder at a speed requiring retardation. The occupancy of the first track section 8T within the retarder by the wheels associated with the front axle, causes the dropping away of the track relay 8TR (see Fig. 1B), and the dropping away of this track relay deenergizes the repeater relay 8TP by the opening of front contact 48 in a manner comparable to that which has been heretofore described for the initiation of timing through a similar track section. With the retarder 10 acting upon the wheels of the car, the speed of the car is reduced, but as has been heretofore pointed out, the speed of the car is still under the timing speed for this track section (see Fig. 2), and thus the speed control is still in the rear truck which may be occupying track section 1T or 2T at this time.

If the car has been travelling at a speed to require retardation as has been heretofore considered, in all probability the rate of the car may not be sufficiently reduced while the front trucks of the car are within the track section 8T, which is the first track section within the retarder, to a speed below the speed for which the track repeater relay TP is set for the track section occupied by the rear trucks of the car. With retardation applied, however, in all probability the car will cease to accelerate, and it may reduce its speed somewhat, dependent upon whether it is a hard or easy rolling car and dependent upon the weight of the car.

As the car progresses through the retarder, the rear trucks of the car progress from track section to track section, and for each track section, as illustrated in Fig. 2, the timing of the associated relay TP is for a higher speed setting, so therefore as the car progresses, the rear trucks of the car come closer to coming below the speed setting for the track section which they occupy. Any time that the speed of the car is reduced below the time setting for the particular governing track section occupied by the rear trucks of the car, the associated relay TP has time to drop away, and by reason of the dropping away of this relay, the circuit for the control of the relay CR (see Fig. 1B) is deenergized, and in accordance with the dropping away of the relay CR, the retarder is opened because the speed of the car has been sufficiently reduced.

For example, if the speed of the car has been reduced below 3.4 miles per hour for the passage of the front axle of the rear trucks through the track section 5T, the repeater relay 5TP has time to drop away because of its timing being set for the 3.4 mile per hour rate. When the relay 5TP is dropped away, the opening of its front contact 41 opens a circuit comparable to a multiple circuit that has been heretofore described which would be required to be closed by occupancy of the front axle of the rear truck of the car within the track section 5T in order to maintain the relay CR picked up and the retarder closed. It has been determined that with the car speed reduced to this point, for a particular grade of the trackway for which the timing values according to Fig. 2 are set, the car will enter the scales at a proper speed to assure sufficient weighing time.

If it is assumed that the relay CR is deenergized by the dropping away of the relay 5TP as described above, or the dropping away of any other track repeater relay TP under similar conditions, the dropping away of this relay CR closes a circuit at its back contact 25 to energize the normal contactor N so as to cause operation of the car retarder motor in a direction to actuate the retarder to its open position. The circuit for energization of the contactor N extends from (+), including back contact 25 of relay CR, contact 44 of the retarder circuit controller mechanism in its right-hand position and winding of the contactor N, to (—). With contactor N energized and contactor R deenergized, energy is applied to the motor through a circuit extending from (+), including the series winding F, back contact 29 of contactor R, armature A, and front contact 28 of contactor N, to (—). It will be noted that the cam 45 of the retarder circuit controller is rotated at this time to a position to permit the roller 46 to ride on the low portion of the cam as it is actuated in a counterclockwise direction as shown in Fig. 1B until it reaches the point 45a of the cam, at which time the contact 44 is actuated to its center position, and thus energy is removed from the contactor N so as to stop operation of the retarder motor after the retarder has been operated to its normally open position.

For cars that cannot have their speed reduced sufficiently by the retarder acting upon the forward trucks as heretofore described, the retarder is maintained closed for further progress of such cars, and the speed of the car at which the retarder will be opened continues to increase as the front axle of the rear truck of the car progresses from track section to track section according to the typical timing chart of Fig. 2 until the maximum speed setting for the track section 8T, which is set for 4.1 miles per hour. This setting of 4.1 miles per hour has been determined for a particular grade of trackway as being the most desirable speed for release of the retarder in order to assure that the retarder will not stop a car when acting upon the rear wheels, and in order to assure sufficient weighing time on the scales.

For the track layout for which the timing chart of Fig. 2 was set up, the grade immediately off of the apex of the hump has been considered as being substantially a 3% grade which tapers off until the section extending through the retarder and through the weighing scales is reduced to approximately a .7% grade. Thus if the retarder is opened when the speed of an average car is reduced to 4.1 miles per hour when the front axle of the rear trucks is within the track section 8T, that car will not gain materially in acceleration before passing over the weighing scales, and thus it will pass over the weighing scales at the desired speed to assure sufficient weighing time.

Inasmuch as there is a wide variation in the rolling characteristics of cars as to whether they are hard or easy rolling, the 4.1 mile per hour rate is determined for the hardest rolling car anticipated to be encountered with the assumption that the hard rolling car will actually reduce its speed on the relatively slight grade with the retarder opened and therefore it is necessary to open the retarder quick enough so that the car will not stall before having passed over the weighing scales, and so that it will not be reduced in speed sufficiently to permit a faster rolling car to catch up with it and prevent proper separation for weighing. If it is an easy rolling car, however, that is released at or below 4.1 miles per hour with the front axle of its rear truck occupying the track section 8T, this car would actually accelerate more with the retarder open, and thus it may be desirable to close the retarder for a second time so as to apply additional retardation to the rear trucks of the car in accordance with the fast rolling characteristics that the car may have. For this reason, the timing for the track sections 9, 10, and 11 is set lower than the timing for the track section 8 so that an easy rolling car will receive additional retardation by closing the retarder for a second time when the forward axle of the rear truck shunts one of these track sections for a time insufficient to permit the dropping away of the track repeater relay TP for such track section. The failure of a track repeater relay TP to be dropped away upon passage of the rear truck under such conditions causes energization of the relay CR to close the retarder by a circuit and mode of operation comparable to that which has been described.

From the description as it has been set forth, and with reference to Fig. 2, it will be noted that the time settings for the track sections 8, 9, 10, and 11 are in such progression that if the speed of a hard rolling car is just below the 4.1 miles per hour with its rear truck in track section 8T so as to open the retarder, the slowing down of the car subsequent to that time due to its hard rolling characteristics will be such as to keep below the lower speed settings for the other track sections so as to prevent the closing of the retarder for a second time.

For a free rolling car, however, that may accelerate on the slight grade through the retarder, passing through the track section 8T at the same speed as the above considered hard rolling car, the retarder is again closed by the timing for one of the lower speed track sections 9, 10, or 11 to provide further retardation. It can thus be said that by the assignment of timing for the respective track sections as has been described, and as is indicated in Fig. 2, that the system can selectively govern the retarder to be left open, or to be closed for a second time, in accordance with whether the car passing through the retarder is hard or easy rolling.

If a condition arises where a second car catches up with a first car within the timing sections, or where two cars go through the retarder coupled together, it may be that the spacing of the rear axle of the first car from the front axle of the second car is substantially comparable to the spacing between axles of one truck. The timing accomplished by this combination does not provide erroneous control of the retarder as the control is in the rear truck of the last car because both cars move at the same speed and the rear truck of the last car is occupying track sections having the lowest speed settings. It will therefore be noted that the presence of a second car coupled to or closely behind the first car will not prevent the proper release of the first car within the retarder after the speed of such car has been reduced to its desired speed for its particular location in approach of the weighing rails of the scales.

One attribute of the scale retarder control system provided by the present invention is that by reason of the retarder being normally open, there is no retardation applied to light and hard rolling cars unnecessarily which could materially slow up the humping operation. In other words, if the retarder were normally closed, and the automatic track circuit control system employed only for the opening of the retarder, a certain amount of retardation would be necessarily applied to each car, whether required or not, for a time interval sufficient to permit the operation of the control apparatus to open the retarder. This, as has been pointed out, would undesirably reduce the speed of slow moving cars, perhaps to the point of stalling the cars within the retarder so as to permit a following car to catch up, and prevent proper weighing on the scales because of the cars progressing in too close proximity to each other.

Having thus described one specific embodiment of the present invention as applied to the control of a particular car retarder mechanism, it is desired to be understood that various modifications, adaptations, and alterations may be made to the specific form of the invention disclosed in accordance with the requirements of practice within the scope of the present invention as limited by the appending claims.

What I claim is:

1. A car retarder control system comprising in combination, a stretch of railway track having several adjoining timing sections of substantially equal length, a brake retarder having respective open and closed positions associated with the track rails of said stretch of track, a track relay and a slow drop away track repeater relay for each of the track sections, the drop away timing for the respective track repeater relays diminishing in order in approach to the retarder, a retarder control relay, circuit means for energizing said retarder control relay only when two adjoining track sections are occupied by respective axles of a car truck and the track repeater relays of those two track sections are both in their picked up positions, and circuit means for selectively governing the actuation of said retarder to said closed or said open position in accordance with whether said retarder control relay is in its picked up or dropped away position.

2. A car retarder control system comprising in combination, a stretch of railway track divided into several adjoining timing sections of substantially equal length, a brake retarder having respective open and closed positions associated with the track rails of said stretch of track, a track relay and a slow drop away track repeater relay for each of the track sections, the drop away times for the respective track repeater relays diminishing in order in approach of the retarder from a particular direction and increasing in the order of passage through the retarder for that direction of traffic, a retarder control relay, circuit means for energizing said retarder control relay when and only when two adjoining track sections are occupied by respective axles of a car truck and the track repeater relays for those two adjoining track sections are in their picked up positions, and circuit means for selectively governing the actuation of said retarder to said closed or open position in accordance with the respective picked up or dropped away position of said retarder control relay.

3. A car retarder control system comprising in combination, a stretch of railway track having several adjoining timing sections of substantially equal length, a brake retarder having respective open and closed positions associated with the track rails of said stretch of track, a track relay and a slow drop away track repeater relay for each of the track sections, the drop away times for the respective track repeater relays being adjusted in accordance with the desired permitted speed of a car passing through the associated track section, a retarder control relay, circuit means for energizing said retarder control relay when and only when said track relay is deenergized and said track repeater relay is energized for each of two adjoining track sections, and circuit means for selectively governing the actuation of said retarder to its closed or open position in accordance with the respective picked up or dropped away position of said retarder control relay.

4. A car retarder control system comprising in combination, a stretch of railway track divided into several short adjoining track sections of substantially equal length, a brake retarder having respective open and closed positions associated with the track rails of said stretch of track for selectively applying or not applying brake pressure to the wheels of cars passing through the retarder, a track relay and a slow drop away track repeater relay for each of the track sections, the drop away times for the respective track repeater relays being established for desired speeds of operation for the passage of the rear trucks of cars through the respective track sections, a stick circuit for each of the track repeater relays for maintaining that relay energized dependent upon occupancy of the next track section in advance, a retarder control relay, circuit means for energizing said retarder control relay only when two adjoining track sections are occupied by respective axles of a car and the track repeater relays for those two adjoining track sections are in their picked up positions, and circuit means for selectively governing the actuation of said retarder to said closed or open position in accordance with whether said retarder control relay is in its picked up or dropped away position.

5. In a car retarder control system of the character described, a stretch of railway track including several short track sections of substantially equal length, a normally open power driven brake car retarder, a track relay and a slow drop away track repeater relay for each of the track sections, the drop away times for the respective track repeater relays being established in accordance with the desired time of travel of the first axle of the rear truck of a car through the associated track section, a car retarder control relay effective when energized to cause the closing of said car retarder and when deenergized to cause the opening of said car retarder, and circuit means for energizing said control relay when any track section is shunted for an insufficient length of time to permit the dropping away of said track repeater relay for the associated track section, provided that the track relay and the track repeater relay for an adjoining track section are respectively in their dropped away and picked up positions.

References Cited in the file of this patent

UNITED STATES PATENTS

| Number | Name | Date |
| --- | --- | --- |
| 1,958,293 | Bone et al. | May 8, 1934 |
| 2,320,802 | Snavely | June 1, 1943 |